United States Patent
Li et al.

(10) Patent No.: US 10,000,276 B2
(45) Date of Patent: Jun. 19, 2018

(54) PUSHING DEVICE, MOVING MECHANISM AND AIRCRAFT

(71) Applicant: AIRBUS (BEIJING) ENGINEERING CENTRE COMPANY LIMITED, Beijing (CN)

(72) Inventors: Ming Li, Beijing (CN); Yumin Sun, Beijing (CN)

(73) Assignee: AIRBUS (BEIJING) ENGINEERING CENTRE COMPANY LIMITED, Beijing (CN)

(*) Notice: Subject to any disclaimer, the term of this patent is extended or adjusted under 35 U.S.C. 154(b) by 250 days.

(21) Appl. No.: 15/134,711

(22) Filed: Apr. 21, 2016

(65) Prior Publication Data

US 2016/0311523 A1    Oct. 27, 2016

(30) Foreign Application Priority Data

Apr. 24, 2015   (CN) .......................... 2015 1 0200853

(51) Int. Cl.
*B64C 13/28* (2006.01)
*B64C 9/16* (2006.01)
(Continued)

(52) U.S. Cl.
CPC ............... *B64C 13/28* (2013.01); *B64C 9/14* (2013.01); *B64C 9/16* (2013.01); *B64C 13/00* (2013.01);
(Continued)

(58) Field of Classification Search
CPC ........... B64C 13/28; B64C 9/14; B64C 13/00; B64C 13/42; B64C 9/16; B64C 2009/143; F03G 1/10
See application file for complete search history.

(56) References Cited

U.S. PATENT DOCUMENTS 2,169,416 A  *  8/1939  Griswold .................. B64C 9/16
                                                              244/216
3,611,828 A     10/1971  Maroshick
(Continued)

FOREIGN PATENT DOCUMENTS

EP         2860103 A1    4/2015

OTHER PUBLICATIONS

European Search Report dated Sep. 2, 2016 EP Application No. 16166150.

*Primary Examiner* — Valentina Xavier
(74) *Attorney, Agent, or Firm* — Hauptman Ham, LLP

(57) ABSTRACT

The present application relates to a pushing device, a moving mechanism and an aircraft. According to an aspect of the present application, a pushing device for a moving mechanism of an aircraft is provided, the moving mechanism including a primary moving device and an auxiliary moving device assisting the primary moving device, the pushing device including a support member and a pushing assembly supported by the support member, and the pushing assembly including a pushing element and an energy storage element. The pushing element is adapted to push a broken part of the auxiliary moving device to an offset position from a normal working position by means of energy from the energy storage element when the auxiliary moving device breaks. According to the present application, it is possible to provide an effective fault protection to the moving mechanism of the aircraft.

16 Claims, 8 Drawing Sheets

(51) Int. Cl.
  *B64C 13/00*   (2006.01)
  *B64C 13/42*   (2006.01)
  *B64C 9/14*    (2006.01)
  *F03G 1/10*    (2006.01)

(52) U.S. Cl.
  CPC ............... *B64C 13/42* (2013.01); *F03G 1/10* (2013.01); *B64C 2009/143* (2013.01)

(56) References Cited

U.S. PATENT DOCUMENTS

| | | |
|---|---|---|
| 4,544,052 A | 10/1985 | Borden |
| 2013/0327887 A1 | 12/2013 | Dyckrup et al. |
| 2015/0060602 A1* | 3/2015 | Naubert .............. F16H 25/2025 244/99.3 |
| 2015/0097077 A1 | 4/2015 | Himmelmann et al. |
| 2016/0304188 A1* | 10/2016 | Moulon .................. B64C 13/28 |

\* cited by examiner

PUSHING DEVICE, MOVING MECHANISM AND AIRCRAFT

RELATED APPLICATIONS

This application claims priority to Chinese Patent Application No. 201510200853.4, filed Apr. 24, 2015, which is incorporated by reference in its entirety herein.

FIELD OF THE INVENTION

This application relates to a pushing device, a moving mechanism including the pushing device and an aircraft including the moving mechanism, and in particular to a pushing device which is capable of providing an effective fault protection to a moving mechanism of an aircraft and is used in the moving mechanism of the aircraft.

BACKGROUND OF THE INVENTION

In an aircraft, such as an airplane, a variety of different moving components are provided for achieving respective functions. For example, these moving components are various moving airfoils arranged on wings, such as flaps for obtaining a larger lift and a better maneuvering capability at a low speed (the flaps may be classified as inboard flaps and outboard flaps and may also be classified as leading slats and trailing flaps, etc.), an aileron for controlling a transverse tilting attitude (gradient) of an airplane, and an airbrake for increasing resistance to reduce the speed of the airplane, and etc.

In another aspect, the moving component may be provided with a damping device for damping the movement of the moving component and thus improving the stability of the movement of the moving component. The damping device moves along with the movement of the moving component, and therefore has a possibility of breaking. Once the damping device breaks, it is possible that the broken part in the damping device impacts a stationary structure, for installing the moving component (for example, a framework structure of a wing), of the airplane and cause damage of the stationary structure which is difficult to repair. In addition, it is possible to further cause a jam after the broken part in the damping device impacts the stationary structure, thereby causing that the moving component fails to keep moving and working normally to achieve its intended function, or, two broken parts in the damping device interfere with each other, thereby leading to a jam and thus causing that the moving component fails to keep moving and working normally to achieve its intended function as well.

Reference is made to FIG. 1 (FIG. 1 is a perspective view showing a first failure case of a damping device for a moving component according to the related technology), in FIG. 1, a collar 150A on a cylinder body side (a left side in FIG. 1) of a damping device 100A according to the related technology has broken and impacted a corresponding portion of a stationary structure (e.g. a rib 300A) of a wing for installing both a moving support structure 200A (the moving component is then installed on the moving support structure 200A to integrally move with the moving support structure 200A) and the damping device 100A. Thus, damage of the rib 300A (the rib 300A is generally difficult to repair) is caused, and it is possible to further cause a jam, thereby resulting in that the moving component fails to keep moving or fails to keep moving smoothly (for example, fails to retract or retract smoothly along the direction A shown in FIG. 1).

Reference is made to FIG. 2 (FIG. 2 is a perspective view showing a second failure case of a damping device for a moving component according to the related technology), in FIG. 2, a rod 120A of the damping device 100A according to the related technology has broken or disengaged from a cylinder body 110A, and an end of the rod 120A is in contact and therefore interference with an end of the cylinder body 110A, thereby causing a jam and as a result, the moving support structure 200A and thus the moving component fail to retract in the direction A shown in FIG. 2.

Therefore, in the art, a technical solution which is capable of preventing the above cases is in demand.

Here, it is to be noted that, the technical contents provided in this section is intended to assist understanding of the present application by the skilled in the art, and do not necessarily constitute the prior art.

SUMMARY OF THE INVENTION

A general summary rather than a comprehensive presentation of full scope of the present application or all of the features of the present application is provided in this section.

One object of the present application is to provide a pushing device which is capable of providing an effective fault protection to a moving mechanism of an aircraft.

Another object of the present application is to provide a pushing device which is configured by an ingenious and simple design principle.

Still another object of the present application is to provide a pushing device which is capable of preventing a broken part of an auxiliary moving device in a moving mechanism from impacting a stationary structure and causing damage of the stationary structure.

Still another object of the present application is to provide a pushing device which is capable of preventing a broken part of an auxiliary moving device in a moving mechanism from causing a jam and resulting in that the moving mechanism fails to keep moving and working normally.

Still another object of the present application is to provide a pushing device which can be installed to a stationary structure conveniently requiring no variation or very small variation to be made to existing structures of the stationary structure and the moving mechanism.

Still another object of the present application is to provide a pushing device which is easy to manufacture and install.

Other objects of the present application are to provide a moving mechanism including the pushing device described above and an aircraft including the moving mechanism described above.

For achieving one or more of the above objects, according to an aspect of the present application, a pushing device for a moving mechanism of an aircraft is provided, the moving mechanism including a primary moving device and an auxiliary moving device assisting the primary moving device, the pushing device including a support member and a pushing assembly supported by the support member, and the pushing assembly including a pushing element and an energy storage element. The pushing element is adapted to push a broken part of the auxiliary moving device to an offset position from a normal working position by means of energy from the energy storage element when the auxiliary moving device breaks.

For achieving one or more of the above objects, according to another aspect of the present application, a moving mechanism for an aircraft is provided including: a primary moving device; and an auxiliary moving device which moves along with the movement of the primary moving device and is configured to assist the primary moving device to achieve an intended function of the primary moving device. The moving mechanism further includes the pushing device described above.

For achieving one or more of the above objects, according to another aspect of the present application, an aircraft is provided. The aircraft includes the moving mechanism described above.

According to the present application, a catapult device (pushing device) for a damping device (auxiliary moving device) of a moving mechanism is configured by an ingenious and simple design principle. Thereby, once the damping device breaks, one of the broken parts of the damping device is catapulted to an offset position offset from the normal working position of the damping device by the catapult device in a horizontal direction before it falls downwards. In this way, it is possible to avoid a situation in which the broken part in the damping device impacts a stationary structure, for installing the moving mechanism, of an airplane (for example, a rib of a wing) and causes the damage of the stationary structure which is hard to repair. In addition, it is further possible to avoid a situation in which a jam may be caused after the broken part of the damping device impacts the stationary structure and thus avoid that the moving mechanism fails to keep moving and working normally to achieve its intended function. In addition, it is further possible to avoid a situation in which a jam is caused due to two broken parts in the damping device interfering with each other and thus avoid that the moving mechanism fails to keep moving and working normally to achieve its intended function.

In addition, according to the present application, the catapult device used in the damping device of the moving mechanism may be installed to the stationary structure of the airplane conveniently requiring no variation or very small variation to be made to the existing structures of the moving mechanism and its damping device and of the stationary structure (for example, the rib). Thus, the easiness of manufacture and installation of the catapult device according to the present application is further improved.

BRIEF DESCRIPTION OF THE DRAWINGS

Features and advantages of one or more embodiments of the present application can be understood more readily with reference to the following description in conjunction with the drawings in which.

DETAILED DESCRIPTION

The present application is described in detail hereinafter with reference to the accompanying drawings and by means of the exemplary embodiment. The following detailed description of the present application is only for the purpose of illustration rather than limitation to the present application and the applications or usages thereof.

Figure 3:
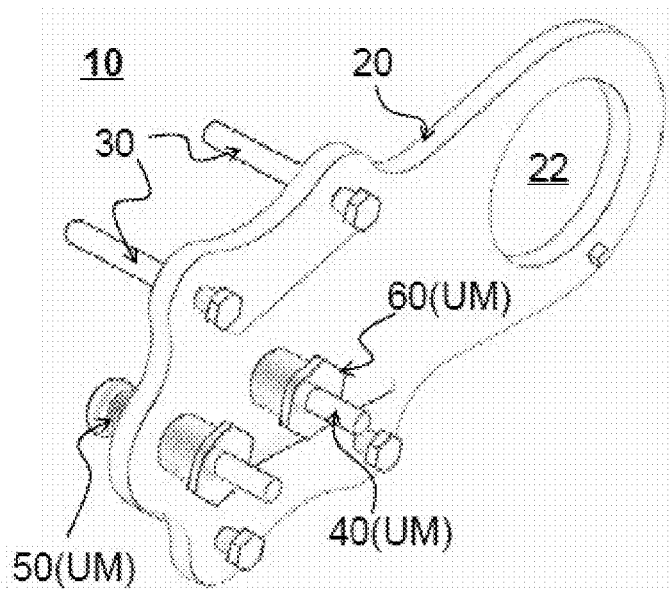
FIG. 3 is a perspective view showing a catapult device according to an exemplary embodiment of the present application.
Figure 4:
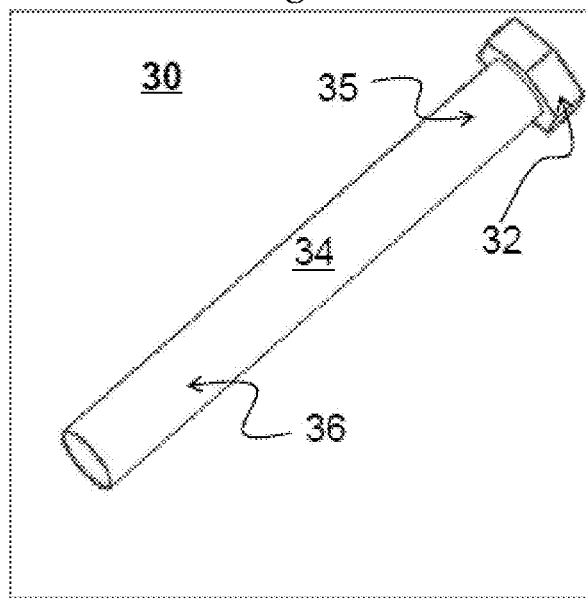
FIGS. 4 to 8 are respectively perspective views showing constituent components of the catapult device according to an exemplary embodiment of the present application.
Figure 5:
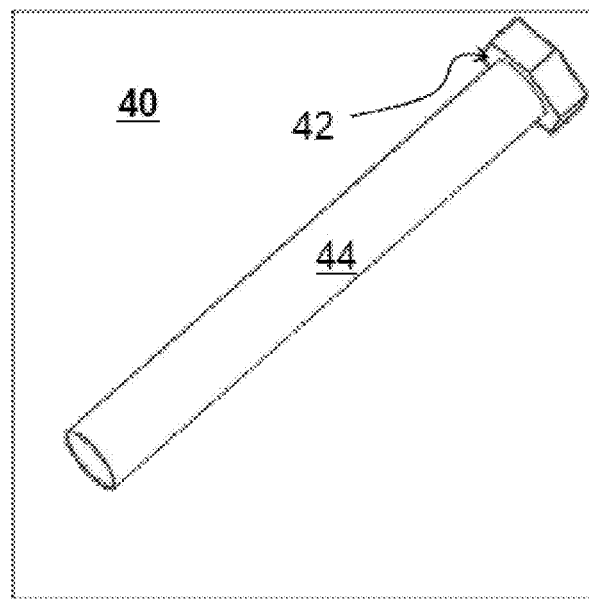
Figure 6:
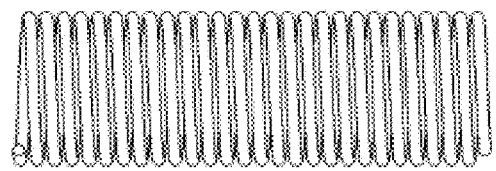
Figure 7:
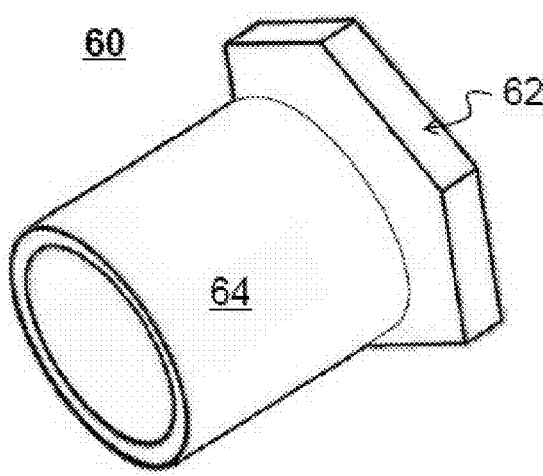
Figure 8:
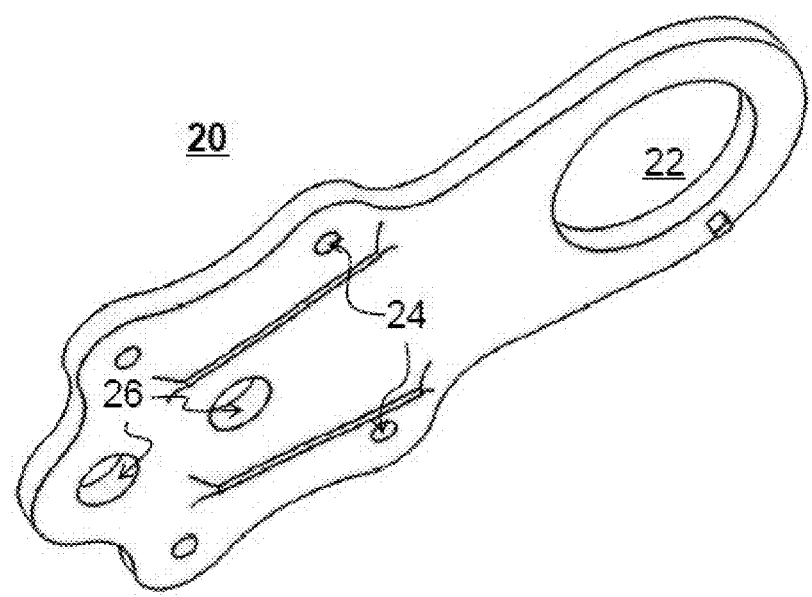
Figure 9:
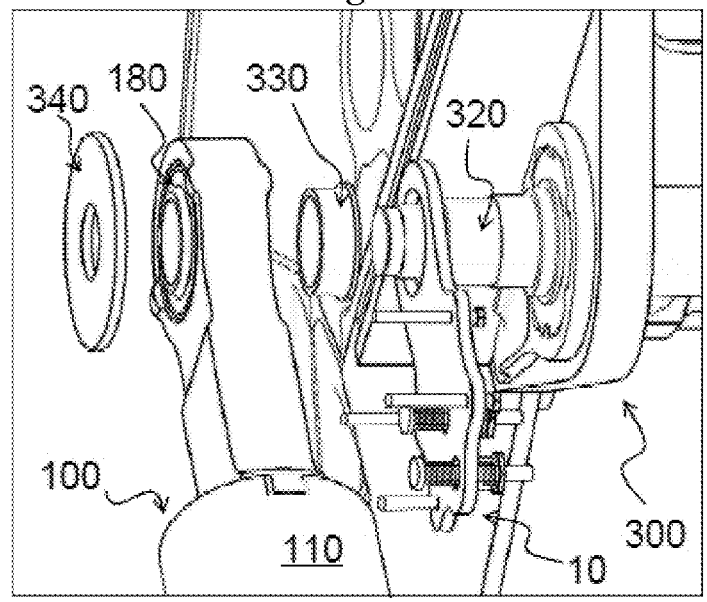
FIG. 9 is a schematic view for illustrating the installation of the catapult device according to an exemplary embodiment of the present application.
Figure 10:
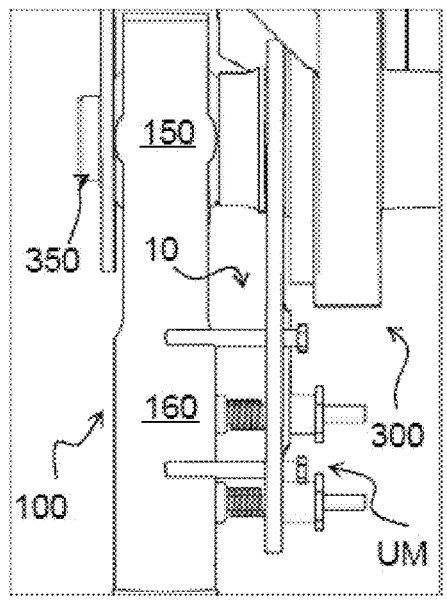
FIG. 10 is an elevation view showing the catapult device having been installed to a stationary structure of an airplane according to an exemplary embodiment of the present application.

First, a catapult device 10 according to an exemplary embodiment of the present application is described with reference to FIGS. 3 to 10. FIG. 3 is a perspective view showing a catapult device according to an exemplary embodiment of the present application; FIGS. 4 to 8 are respectively perspective views showing constituent components of the catapult device according to an exemplary embodiment of the present application; FIG. 9 is a schematic view for illustrating the installation of the catapult device according to an exemplary embodiment of the present application; and FIG. 10 is an elevation view showing the catapult device having been installed to a stationary structure of an airplane according to an exemplary embodiment of the present application.

As shown in the drawings, the catapult device 10 may include a bracket 20, a rail bolt 30, a pin 40 (corresponding to a pushing element), a spring 50 (corresponding to an energy storage element) and a screw thread member 60. Here, it is to be noted that the catapult device 10 serves as a pushing device according to the present application.

The bracket 20 may be a substantially long-shaped plate, and a shaft hole 22 is provided at one end thereof (a right end in FIG. 3 and it may also be referred to as a proximal end) and a bolt hole 24 and a pin hole 26 are provided at the other end thereof (a left end in FIG. 3 and it may also be referred to as a distal end). A shaft hole 22 is sleeved on an installation shaft 320 for installing a damping device 100 (reference is made to FIG. 9, and the installation shaft 320 may be, for example, fixedly attached to a corresponding portion of a rib 300 of a wing), thus the bracket 20 is enabled to be installed to the rib 300 (serving as a stationary structure according to the present application) in a rotatable manner. Here, it is to be noted that the bracket 20 serves as a support member according to the present application.

The rail bolt 30 may have a head portion 32 and a rod portion 34. In some examples, external screw threads may be only provided on an area, adjacent to the head portion 32, of the rod portion 34 (external screw thread portion 35), and an area at a distal end of the rod portion 34 is not provided with external screw threads (sliding bearing portion 36). In other examples, external screw threads may be provided over the whole length of the rod portion 34. The rail bolt 30 may be inserted through the bolt hole 24 and connected with the bolt hole 24 (the bolt hole 24 may be provided with internal screw threads) by screw threads, thus being attached to the bracket 20 (referring to FIG. 3). However, it is conceivable to use other appropriate fixedly connecting method other than the screw thread connection.

In the illustrated example, four rail bolts 30 are provided (correspondingly, four bolt holes 24 are provided in the bracket 20). As shown in FIG. 10, in an installed state that the catapult device 10 is installed to the rib 300, the damping device 100 (specifically, a connection section 160, adjacent to a collar 150 and on a cylinder body side and for connecting the collar 150 and the cylinder body, of the damping device 100) is clamped between the upper pair of rail bolts 30 (the pair of rail bolts shown in FIG. 10) and the lower pair of rail bolts 30 (not shown in FIG. 10).

Thus, as the damping device 100 rotates about the installation shaft 320, the catapult device 10 also rotates about the installation shaft 320 by means of the transmission function of the rail bolts 30. Here, it is to be noted that the rail bolt 30 serves as a transmission member according to the present application.

The transmission member is embodied as the rail bolts 30 clamping the damping device 100 from the outside of the damping device 100, and thus the clamping of the damping device 100 by the transmission member and the transmission of the movement from the damping device 100 to the catapult device 10 may be achieved without additional machining of the damping device 100. In a case that the damping device 100 is an externally sourced standard part, the condition that no additional machining and variation to the existing structure is particularly advantageous.

The pin 40 may have a head portion 42 (also referred to as an abutting portion) and a rod portion 44. As shown in FIG. 10, the head portion 42 abuts against the connection section 160 in an installed state that the catapult device 10 is installed to the rib 300.

The spring 50 may be in the form of helical spring. However, it is conceivable to use other appropriate kinds of spring.

The screw thread member 60 (also referred to as an elastic regulating member) may have a head portion 62 and a cylindrical portion 64. The head portion 62 may be a hexagonal plate for facilitating the screwing of the screw thread member 60 by using a special tool. The head portion 62 may be provided with a central through hole for the rod portion 44 of the pin 40 to pass through. The cylindrical portion 64 may be a hollow cylinder body so as to accommodate one end of the spring 50 in the cylindrical portion 64. An outer circumference of the cylindrical portion 64 may be provided with external screw threads, and thereby the screw thread member 60 may be connected with the pin hole 26 (the pin hole 26 may be provided with internal screw threads) by screw threads.

As shown in FIG. 10, in an installed state that the catapult device 10 is installed to the rib 300, the spring 50 surrounds the rod portion 44 of the pin 40 and is clamped between the head portion 42 of the pin 40 and the head portion 62 of the screw thread member 60 which has been screwed into the pin hole 26. The compression extent (i.e., the preloaded extent) of the spring 50 may be conveniently regulated by screwing the screw thread member 60. In some examples, the spring 50 (each) may be regulated to apply an elastic force of (about) 80N. Here, it is to be noted that the pin 40, the spring 50, and the screw thread member 60 may constitute the catapult assembly or pushing assembly UM according to the present application.

In the illustrated example, two catapult assemblies are provided (i.e., two sets of pins 40, springs 50 and screw thread members 60), and the two catapult assemblies are located between the upper pair of rail bolts 30 and the lower pair of rail bolts 30 in a transverse direction of the catapult device 10 (a vertical direction in FIG. 3).

In the illustrated example, the catapult device 10 is arranged on the cylinder body side of the damping device 100. In this way, there is generally a large space near the cylinder body side of the damping device 100, and the connection section 160, on the cylinder body side, of the damping device 100 is adapted to be clamped by the rail bolts and catapulted by the catapult assembly, therefore, such arrangement is particularly advantageous.

The moving mechanism MM applying the catapult device 10 according to an exemplary embodiment of the present application is described hereinafter with reference to FIG. 11.

Figure 1:
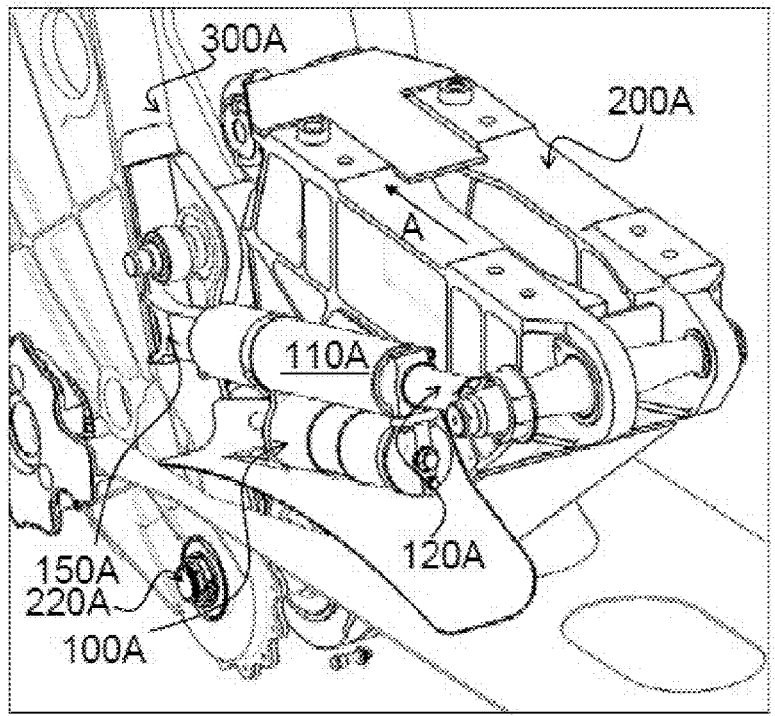
FIG. 1 is a perspective view showing a first failure case of a damping device for a moving component according to the related technology.
Figure 2:
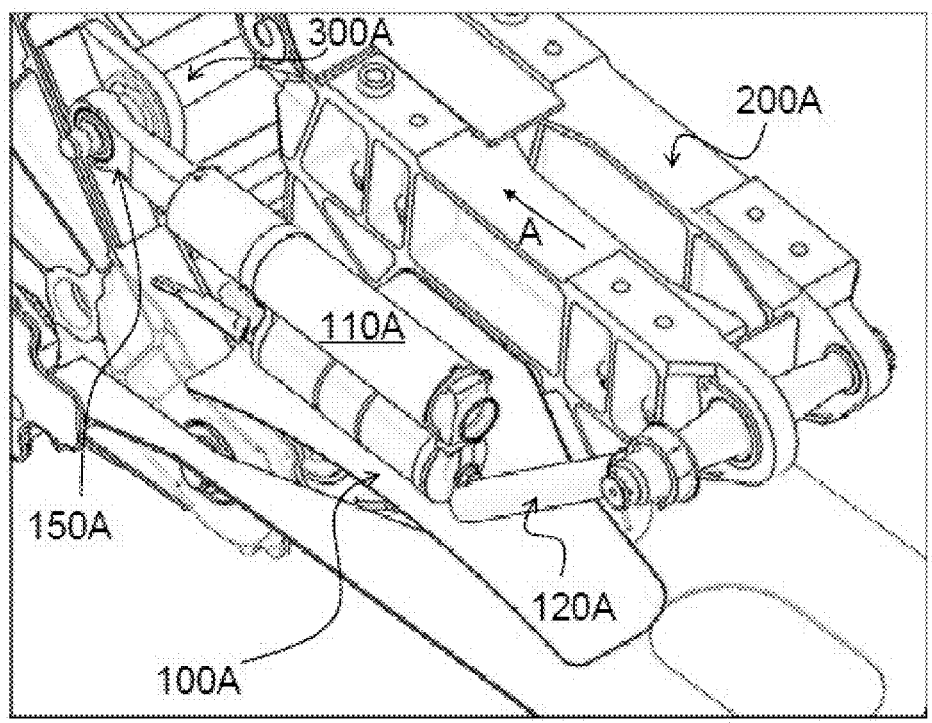
FIG. 2 is a perspective view showing a second failure case of a damping device for a moving component according to the related technology.

For example, the moving mechanism MM is movably installed on the rib 300 of the wing. In some examples, the moving mechanism MM may include a flap assembly (not shown), e.g., an inboard flap (IBF). The flap assembly includes a flap body and a moving support structure (moving lever) 200, and the flap body may be fixedly installed on an upper surface 210 of the moving support structure 200 to integrally move with the moving support structure 200. Through driving by a flap actuator (not shown), the moving support structure 200 is rotatable together with the flap body (i.e., the flap assembly) with a shaft portion (not shown in FIG. 11, however, reference may be made to a shaft portion 220A shown in FIG. 1 corresponding to the shaft portion) as a rotation center. In addition, a distal end of the moving support structure 200 may be further provided with a connecting shaft 230 for connecting with the damping device 100. In a case that the moving support structure 200 rotates in an anti-clockwise direction (with respect to FIG. 11), the flap body retracts towards the wing body, and in a case that the moving support structure 200 rotates in a clockwise direction (with respect to FIG. 11), the flap body extends towards the outside of the wing body.

For damping the movement of the moving mechanism MM and improving the moving stability of the moving mechanism MM, the moving mechanism may be provided with the damping device 100. In the illustrated examples, the damping device 100 may include: a cylinder body 110 (for example, a double-cylinder structure); a rod 120 inserted into the cylinder body 110 and thus being slidable with respect to the cylinder body 110; a proximal end collar 150 located on the cylinder body side of the damping device 100 (a left side in FIG. 11) for being sleeved on the installation shaft 320 of the rib 300; a connection section 160 adjacent to the collar 150 and for connecting the collar 150 and the cylinder body 110 (in some examples, the connection section 160 may be formed to have a pair of opposite flat surfaces adapted to be clamped by the rail bolts 30 and have a flat surface adapted to be abutted by the head portion 42 of the pin 40, and, the connection section 160 corresponds to a corresponding portion according to the present application); and a distal end collar 170 located on a rod side (a right side in FIG. 11) of the damping device 100 for being sleeved on the connecting shaft 230 of the moving support structure 200. Here, it is to be noted that the damping device 100 serves as an auxiliary moving device according to the present application, and the flap assembly serves as a primary moving device according to the present application. The primary moving device is a necessary device for an airplane to achieve a respective intended function, and the auxiliary moving device is configured to assist the primary moving device to achieve its intended function reliably, however, in a case that the auxiliary moving device fails, the primary moving device can still completely or substantially achieve its intended function with some performance (such as moving stability) being lost.

In a case that the moving support structure 200 rotates with the shaft portion as a rotation center, the damping device 100 follows the movement of the moving support structure 200 to rotate with the installation shaft 320 as a rotation center, at the same time, in the damping device 100, the rod 120 slides in the cylinder body 110 to cause the damping device 100 to move telescopically. Thereby, the damping device 100 functions to damp the movement of the moving support structure 200 and thus of the flap body. For example, the damping device 100 may be embodied in an appropriate damper form such as a hydraulic damper, an air damper, and a mechanical damper (such as a mechanical spring).

In a preferred example, the proximal end collar 150 and/or the distal end collar 170 are provided with a ball-and-socket joint (a proximal end ball-and-socket joint 180 at the proximal end collar 150 is shown in FIG. 9). Adopting the ball-and-socket joint, not only the damping device 100 is allowed to rotate in the below-described normal working position, but also the damping device 100 is allowed to be easily pushed to the below-described offset position by the catapult device 10 in a case that the damping device 100 breaks, thereby ensuring that the catapult device 10 can achieve its intended protection function.

In a preferred example, a catcher 400 is provided in the moving mechanism MM. The catcher may be in a trough shape so as to catch a broken part of the damping device 100 falling down in a case that the damping device 100 breaks accidentally. In a case that the broken part is caught on the catcher 400, the broken damping device 100 will not interfere with the normal movement of the moving mechanism MM (in particular the retracting movement), and thus the moving mechanism MM can still keep working though with the damping being lost.

The exemplary installation process for installing the catapult device 10 according to an exemplary embodiment of the present application to the rib 300 is described hereinafter.

With reference to FIGS. 9 and 10, the shaft hole of the catapult device 10 in an assembled state (referring to FIG. 3) is sleeved on the installation shaft 320 provided on a corresponding portion of the rib 300 of the wing (in some examples, the installation shaft 320 may be fixedly attached to the rib 300). Then, a bush 330, the proximal end collar 150 of the damping device 100, and a washer 340 are sleeved on the installation shaft 320 in sequence. Then, a fastening nut 350 is screwed to a threaded end of the installation shaft 320.

In an installed state that the catapult device 10 is installed, the bush 330 spaces the catapult device 10 (specifically, the proximal end of the bracket 20 provided with the shaft hole 22) from the damping device 100 (specifically, the proximal end collar 150) by a predetermined distance. Meanwhile, in the installed state that the catapult device 10 is installed, the connection section 160 of the damping device 100 is clamped between the rail bolts 30, and the head portion 42 of the pin 40 abuts against the connection section 160 under a biasing force provided by the spring 50.

The working process of the catapult device 10 according to the exemplary embodiment of the present application in a first failure case of the damping device is described hereinafter with reference to FIGS. 11 to 15 (FIGS. 11 to 15 are a series of views showing the working process of the catapult device according to an exemplary embodiment of the present application in the first failure case of the damping device).

Figure 11:
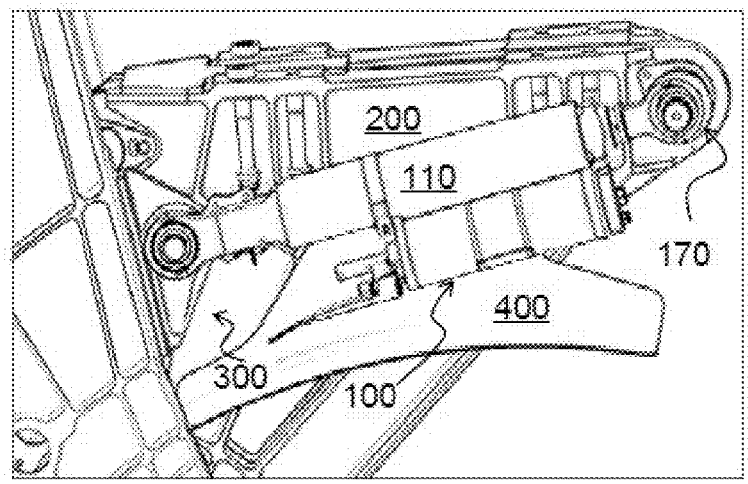
FIGS. 11 to 15 are a series of views showing the working process of the catapult device according to an exemplary embodiment of the present application in a first failure case of the damping device.

In FIG. 11, the moving support structure 200 is rotating in the clockwise direction to cause the flap body to extend outwards. Therefore, the damping device 100 is also rotating in the clockwise direction while extending in a longitudinal direction. At this time, the catapult device 10 is rotating along with the rotation of the damping device 100 as well.

Figure 12:
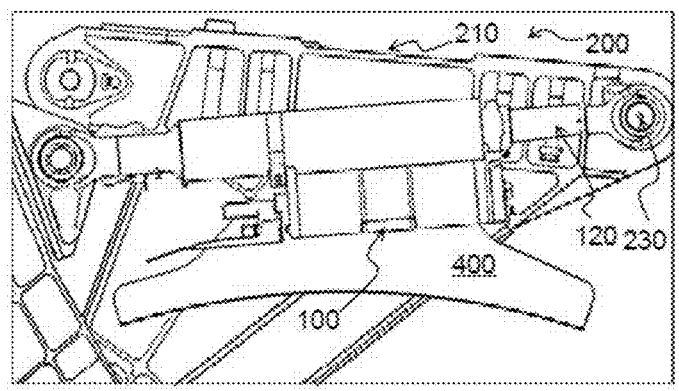

In FIG. 12, the moving support structure 200 keeps rotating in the clockwise direction and the damping device 100 keeps extending in the longitudinal direction, and at this time, the proximal end collar 150 of the damping device 100 breaks.

Figure 13:
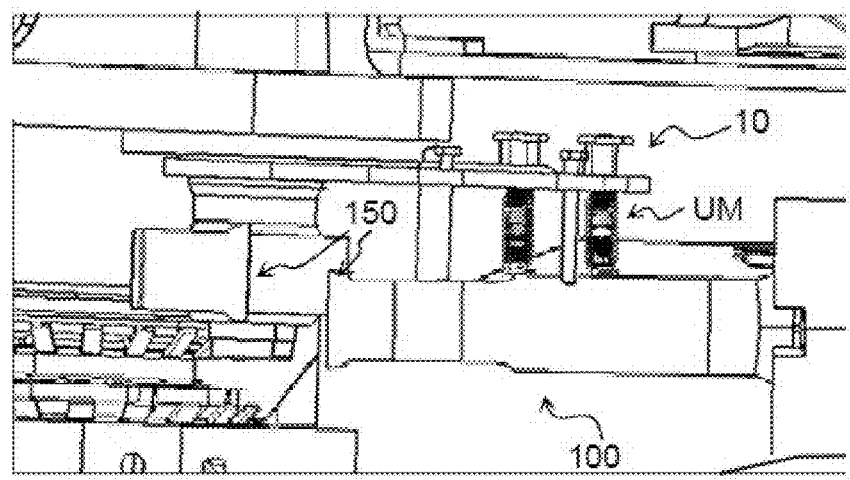

In FIG. 13, the damping device 100 which has broken is clamped temporarily by the rail bolts 30 instead of falling down immediately and impacting a corresponding portion, under the damping device 100, of the rib 300, at the same time, under the action of the biasing force of the spring 50 which has been appropriately preloaded, the head portion 42 of the pin 40 pushes the connection section 160 of the broken damping device 100 in a horizontal direction (a downward direction in FIG. 13), thus catapulting a right part (with respect to FIG. 13) of the broken damping device 100 to an offset position OP1 (refereeing to FIG. 15) offset from the normal working position WP of the damping device 100 (referring to FIG. 15) in the horizontal direction. Thereby, the broken part of the damping device 100 falling down is offset from a corresponding portion, under the normal working position of the damping device 100, of the rib 300 in the horizontal direction and will not impact this corresponding portion. Here, it is to be noted that, the offset position may refer to a position from which the broken part of the damping device, when falling down, will not impact the corresponding portion, under the damping device 100, of the rib 300, instead, it may fall safely downwards onto the catcher 400; and in a case that there are two broken parts falling downwards, the offset position may refer to a position from which one of the broken parts falls downwards and ensures that the two broken parts safely fall downwards onto the catcher 400, thus avoiding interference of broken ends of the two broken parts with each other due to contacting.

Figure 14:
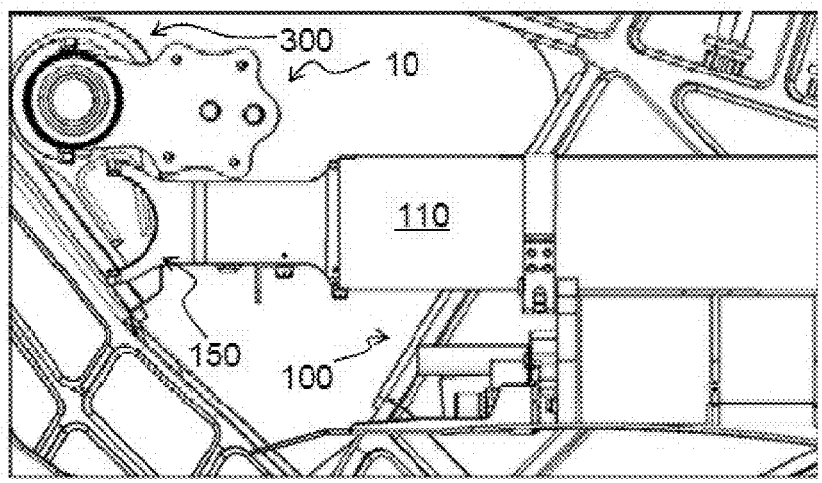
Figure 15:
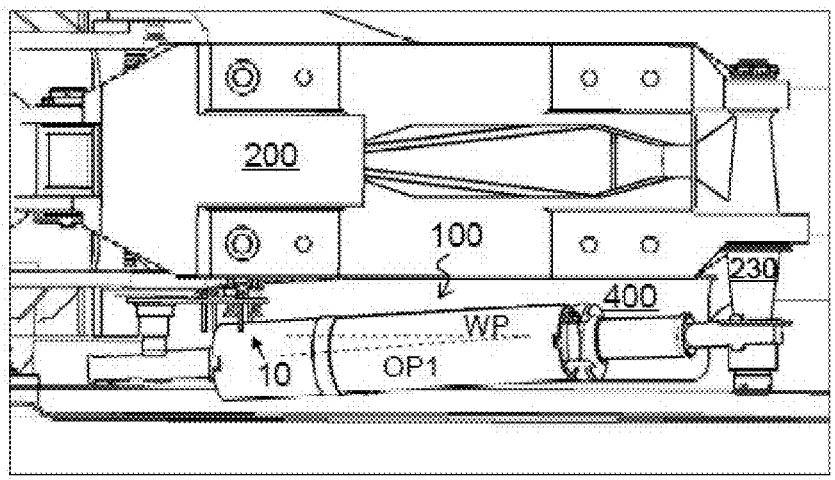

In FIGS. 14 and 15, it is shown in different view angles that the broken part of the damping device 100 having been catapulted to the offset position OP1 safely falls downwards onto the catcher 400.

Figure 16:
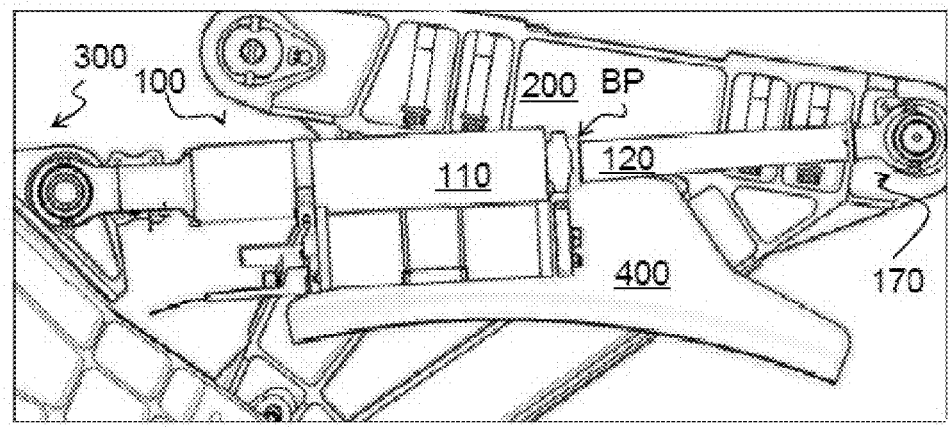
FIGS. 16 to 18 are a series of views showing the working process of the catapult device according to an exemplary embodiment of the present application in a second failure case of the damping device.
Figure 17:
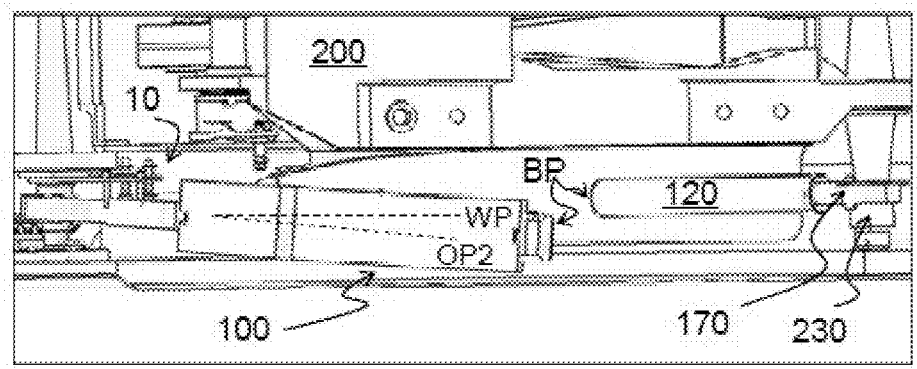
Figure 18:
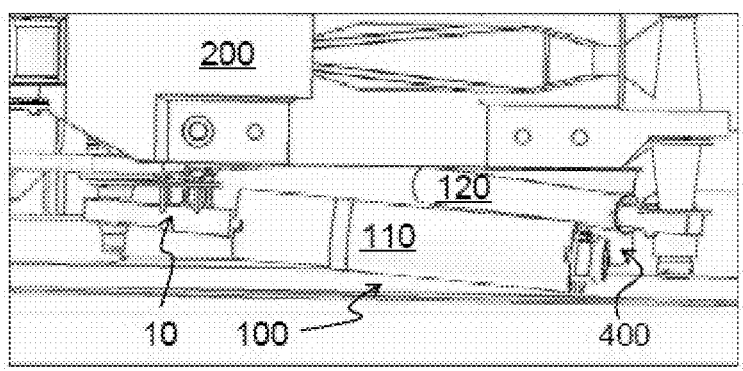

The working process of the catapult device 10 according to the exemplary embodiment of the present application in a second failure case of the damping device is described hereinafter with reference to FIGS. 16 to 18 (FIGS. 16 to 18 are a series of views showing the working process of the catapult device according to an exemplary embodiment of the present application in the second failure case of the damping device).

In FIG. 16, the rod 120 of the damping device 100 having extended to a certain degree is breaking at a portion BP close to the cylinder body 110.

In FIG. 17, the damping device 100 which has broken is clamped temporarily by the rail bolts 30 instead of falling down immediately, and at the same time, under the action of the biasing force of the spring 50 which has been appropriately preloaded, the head portion 42 of the pin 40 pushes the connection section 160 of the broken damping device 100 in a horizontal direction (a downward direction in FIG. 17), thus catapulting a left part (with respect to FIG. 17) of the broken damping device 100 to an offset position OP2 (refereeing to FIG. 17) offset from the normal working position WP of the damping device 100 (referring to FIG. 17) in the horizontal direction. Thereby, the broken part of the damping device 100 at the left side is allowed to fall downwards from the offset position OP2, and meanwhile the broken part of the damping device 100 at the right side (with respect to FIG. 17) is allowed to fall downwards from the normal working position WP. In this way, the two broken parts fall downwards offset from each other in the horizontal direction, and thus the broken ends of the two broken parts may not contact and interfere with each other, and thereby a jam will not be caused which will make the moving support structure 200 and thus the whole moving mechanism MM fail to move (in particular to retract) normally.

In FIG. 18, the broken part at the left side and the broken part at the right side have fallen downwards onto the catcher 400 offset from each other in the horizontal direction; and also the moving support structure 200 together with the flap body has retracted completely to the retracted position.

According to the exemplary embodiment of the present application, a catapult device which is used in a damping device of a moving mechanism is configured by an ingenious and simple design principle. Thereby, once the damping device breaks, one of the broken parts of the damping device is catapulted to an offset position offset from the normal working position of the damping device by the catapult device in a horizontal direction before it falls downwards. In this way, it is possible to avoid a situation in which the broken part in the damping device impacts a stationary structure, for installing the moving mechanism, of an airplane (for example, a rib of a wing) and causes the damage of the stationary structure which is hard to repair. In addition, it is further possible to avoid a situation in which a jam may be caused after the broken part of the damping device impacts the stationary structure and thus avoid that the moving mechanism fails to keep moving and working normally to achieve its intended function. In addition, it is further possible to avoid a situation in which a jam is caused due to two broken parts in the damping device interfering with each other and thus avoid that the moving mechanism fails to keep moving and working normally to achieve its intended function.

In addition, according to the exemplary embodiment of the present application, the catapult device used in the damping device of the moving mechanism may be installed to the stationary structure of the airplane conveniently requiring no variation or very small variation to be made to the existing structures of the moving mechanism and its damping device and of the stationary structure (for example, the rib). Thus, the easiness of manufacture and installation of the catapult device according to the exemplary embodiment of the present application is further improved.

The catapult device according to the present application may permit various modifications, and these modifications may obtain substantially the same effect as the catapult device according to the above exemplary embodiment of the present application.

In the above exemplary embodiment, four rail bolts and two catapult assemblies are provided. However, it is conceivable that the number of the rail bolts and the catapult assemblies (combination of a pin, a spring and a screw thread member) may be varied.

In the above exemplary embodiment, the transmission member is embodied as a rail bolt. However, other appropriate forms of the transmission member may be conceived, for example, an upper clamping plate and a lower clamping plate for clamping a corresponding portion of the damping device therebetween form an upper side and a lower side, and for another example, a rail bolt which is inserted in a rotatable and axially slidable manner into a sliding hole provided at a corresponding portion of the damping device.

In the above exemplary embodiment, the catapult assembly/pushing assembly is embodied as a mechanical helical spring assembly. However, other appropriate forms of the catapult assembly may be conceived, for example, a pneumatic assembly and a fireworks pushing assembly which can be activated automatically when the damping device breaks.

In the above exemplary embodiment, the catapult device moves along with the movement of the damping device. However, it is conceivable that the catapult assembly may also be still with respect to the catapult assembly. For example, in a case that the catapult device is embodied as a fireworks pushing assembly, the catapult assembly may not move along with the movement of the damping device, as long as the catapult device can effectively push a broken part of the damping device to an offset position regardless of a position where the damping device is located when the damping device breaks.

In the above exemplary embodiment, the support member is embodied as a bracket.

However, other appropriate forms of the supporting member may be conceived, for example, a still support member extending directly from a stationary structure.

In the above exemplary embodiment, the auxiliary moving device is embodied as a damping device. However, other appropriate forms of the auxiliary moving device may be conceived, for example, other auxiliary moving devices configured to assist the flap assembly to achieve its intended function from other aspects and move along with the movement of the flap assembly as well.

In the above exemplary embodiment, the primary moving device is exemplified as a flap assembly. However, other appropriate forms of the primary moving device may be conceived, for example, other moving devices in the airplane (such as an aileron assembly, an airbrake assembly, an elevator assembly and a rudder assembly).

In the present application, a moving mechanism including the pushing device used in an aircraft AC is further provided.

Figure 19:
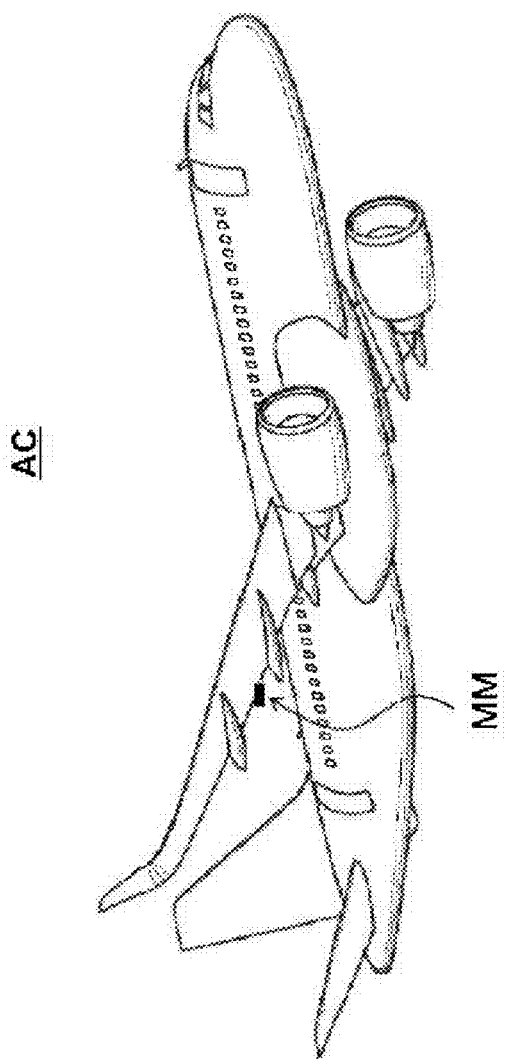
FIG. 19 is a schematic view showing an aircraft according to the present application.

In the present application, an aircraft AC including the moving mechanism is further provided (in particular, reference is made to FIG. 19, which is a schematic view showing the aircraft according to the present application).

In summary, the following advantageous solutions may be included according to the present application.

In the pushing device according to the present application, the energy storage element is a spring.

In the pushing device according to the present application, the support member is a bracket in which a pin hole is formed, the pushing element is a pin having a pin head portion and a pin rod portion passing through the pin hole, and the spring is sleeved on the pin rod portion and is located between the pin head portion and the bracket.

In the pushing device according to the present application, the support member is a bracket in which a pin hole is formed, the pushing element is a pin having a pin head portion and a pin rod portion, the pushing assembly further includes an elastic regulating member having a regulation head portion and a cylindrical portion, the regulation head portion being provided with a through hole through which the pin rod portion passes, the spring surrounds the pin rod portion and is clamped between the pin head portion and the regulation head portion of the elastic regulating member having been connected into the pin hole, and by regulating the position of the elastic regulating member with respect to the pin hole, a biasing force of the spring can be regulated and therefore an abutting force of the pin head portion abutting against a corresponding portion of the auxiliary moving device can be regulated.

In the pushing device according to the present application, the cylindrical portion is a hollow cylinder body so as to accommodate an end of the spring in the cylindrical portion, an outer circumference of the cylindrical portion is provided with external screw threads, the pin hole is provided with internal screw threads, and the elastic regulating member is adapted to be connected with the pin hole by screw threads, thereby regulating the position of the elastic regulating member with respect to the pin hole.

In the pushing device according to the present application, the pushing device further includes a transmission member, and the transmission member is adapted to transmit the movement of the auxiliary moving device to the pushing device, so that the pushing device moves along with the movement of the auxiliary moving device.

In the pushing device according to the present application, the transmission member is adapted to clamp a corresponding portion of the auxiliary moving device.

In the pushing device according to the present application, a bolt hole is formed in the bracket, and the transmission member includes a rail bolt, the rail bolt passes through and is connected to the bolt hole, and the rail bolt has a rail bolt rod portion adapted to clamp the corresponding portion of the auxiliary moving device.

In the pushing device according to the present application, the rail bolt includes a first pair of rail bolts and a second pair of rail bolts, and the first pair of rail bolts and the second pair of rail bolts clamp therebetween the corresponding portion of the auxiliary moving device from outside.

In the pushing device according to the present application, a shaft hole is formed in the bracket and the shaft hole is sleeved on an installation shaft for installing the auxiliary moving device so that the pushing device rotates about the installation shaft as well when the auxiliary moving device rotates about the installation shaft.

In the moving mechanism according to the present application, the primary moving device is a flap assembly.

In the moving mechanism according to the present application, the auxiliary moving device is a damping device.

In the moving mechanism according to the present application, the flap assembly includes a flap body and a moving support structure, and the flap body is fixedly installed on the moving support structure so as to move integrally with the moving support structure, the damping device has a proximal end and a distal end, the proximal end is connected in a rotatable manner to an installation shaft attached to a stationary structure of the aircraft, and the distal end is connected in a rotatable manner to a connecting shaft provided at the moving support structure, and the pushing device is arranged at a side of the proximal end of the damping device.

In the moving mechanism according to the present application, the proximal end is connected in a rotatable manner to the installation shaft via a proximal end ball-and-socket joint or a proximal end ball bearing, and/or, the distal end is connected to the connecting shaft in a rotatable manner via a distal end ball-and-socket joint or a distal end ball bearing.

In the moving mechanism according to the present application, the moving mechanism further includes a catcher arranged under the damping device so as to catch the broken part falling downwards.

In this disclosure, use of the orientation terms such as "upper" and "lower" is only for the purpose of describing, and should not be deemed as limiting.

In this description, when referring to "exemplary embodiment", "some examples", "other examples", "preferred examples" and "illustrated examples" and etc., it means that a specific feature, structure or characteristics described in relation to this embodiment/example is included in at least one embodiment/example of the present application. Appearance of these words in this description at different places does not necessarily indicate one and the same embodiment/example. In addition, when describing a specific feature, structure or characteristics in relation to any one of the embodiments/examples, it should be considered that such feature, structure or characteristics may be effected by the skilled in the art in other embodiments/examples of all the embodiments/examples.

While the present application has been described with reference to the exemplary embodiment, it should be understood that the present application is not limited to the specific embodiments/examples described and illustrated in detail herein. Those skilled in the art can make various variants to the exemplary embodiment without departing from the scope defined by the claims.

The invention claimed is:

1. A pushing device for a moving mechanism of an aircraft, the moving mechanism comprising a primary moving device and an auxiliary moving device assisting the primary moving device, the pushing device comprising a support member and a pushing assembly supported by the support member, and the pushing assembly comprising a pushing element and an energy storage element,
wherein the pushing element is adapted to push a broken part of the auxiliary moving device to an offset position from a normal working position by means of energy from the energy storage element when the auxiliary moving device breaks.

2. The pushing device according to claim 1, wherein the energy storage element is a spring.

3. The pushing device according to claim 2, wherein
the support member is a bracket in which a pin hole is formed,
the pushing element is a pin having a pin head portion and a pin rod portion passing through the pin hole, and
the spring is sleeved on the pin rod portion and is located between the pin head portion and the bracket.

4. The pushing device according to claim 2, wherein
the support member is a bracket in which a pin hole is formed,
the pushing element is a pin having a pin head portion and a pin rod portion,
the pushing assembly further comprises an elastic regulating member having a regulation head portion and a cylindrical portion, the regulation head portion being provided with a through hole through which the pin rod portion passes,
the spring surrounds the pin rod portion and is clamped between the pin head portion and the regulation head portion of the elastic regulating member having been connected into the pin hole, and
by regulating the position of the elastic regulating member with respect to the pin hole, a biasing force of the spring can be regulated and therefore an abutting force of the pin head portion abutting against a corresponding portion of the auxiliary moving device can be regulated.

5. The pushing device according to claim 4, wherein the cylindrical portion is a hollow cylinder body so as to accommodate an end of the spring in the cylindrical portion, an outer circumference of the cylindrical portion is provided with external screw threads, the pin hole is provided with internal screw threads, and the elastic regulating member is adapted to be connected with the pin hole by screw threads, thereby regulating the position of the elastic regulating member with respect to the pin hole.

6. The pushing device according to claim 3, wherein the pushing device further comprises a transmission member, and the transmission member is adapted to transmit the movement of the auxiliary moving device to the pushing device, so that the pushing device moves along with the movement of the auxiliary moving device.

7. The pushing device according to claim 6, wherein the transmission member is adapted to clamp a corresponding portion of the auxiliary moving device.

8. The pushing device according to claim 7, wherein
a bolt hole is formed in the bracket, and
the transmission member comprises a rail bolt, the rail bolt passes through and is connected to the bolt hole, and the rail bolt has a rail bolt rod portion adapted to clamp the corresponding portion of the auxiliary moving device.

9. The pushing device according to claim 8, wherein the rail bolt comprises a first pair of rail bolts and a second pair of rail bolts, and the first pair of rail bolts and the second pair of rail bolts clamp therebetween the corresponding portion of the auxiliary moving device from outside.

10. The pushing device according to claim 3, wherein a shaft hole is formed in the bracket and the shaft hole is sleeved on an installation shaft for installing the auxiliary moving device so that the pushing device rotates about the installation shaft as well when the auxiliary moving device rotates about the installation shaft.

11. A moving mechanism for an aircraft, comprising:
a primary moving device; and
an auxiliary moving device which moves along with the movement of the primary moving device and is configured to assist the primary moving device to achieve an intended function of the primary moving device,
wherein the moving mechanism further comprises the pushing device according to claim 1.

12. The moving mechanism according to claim 11, wherein the primary moving device is a flap assembly.

13. The moving mechanism according to claim 12, wherein the auxiliary moving device is a damping device.

14. The moving mechanism according to claim 13, wherein
the flap assembly comprises a flap body and a moving support structure, and the flap body is fixedly installed on the moving support structure so as to move integrally with the moving support structure,
the damping device has a proximal end and a distal end, the proximal end is connected in a rotatable manner to an installation shaft attached to a stationary structure of the aircraft, and the distal end is connected in a rotatable manner to a connecting shaft provided at the moving support structure, and
the pushing device is arranged at a side of the proximal end of the damping device.

15. The moving mechanism according to claim 14, wherein the proximal end is connected in a rotatable manner to the installation shaft via a proximal end ball-and-socket joint or a proximal end ball bearing, and/or, the distal end is connected to the connecting shaft in a rotatable manner via a distal end ball-and-socket joint or a distal end ball bearing.

16. An aircraft, wherein the aircraft comprises the moving mechanism according to claim 11.

* * * * *